United States Patent
Guzorek et al.

(10) Patent No.: US 6,179,390 B1
(45) Date of Patent: *Jan. 30, 2001

(54) ELECTRONIC TRAILER BRAKE CONTROLLER

(75) Inventors: Richard J. Guzorek, Rockford; Ralph E. Verburg, Jenison; John T. Kovitz, Walker; Ray M. Hallenbeck, Metamora, all of MI (US)

(73) Assignee: Saturn Electronics & Engineering, Inc., Auburn Hills, MI (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/066,635

(22) Filed: Apr. 24, 1998

(51) Int. Cl.[7] .................................................. B60T 13/66
(52) U.S. Cl. .............................. 303/7; 188/3 R; 303/20
(58) Field of Search .................... 188/3 R, 112; 303/3, 7, 15, 20, 124; 701/70

(56) References Cited

U.S. PATENT DOCUMENTS

| | | | |
|---|---|---|---|
| 4,295,687 | * | 10/1981 | Becker et al. . |
| 4,398,252 | * | 8/1983 | Frait . |
| 4,804,237 | * | 2/1989 | Gee et al. ................................. 303/7 |
| 4,856,850 | * | 8/1989 | Aichele et al. ........................ 303/20 |
| 5,076,114 | * | 12/1991 | Moody . |
| 5,115,162 | * | 5/1992 | Leonard et al. . |
| 5,294,190 | * | 3/1994 | Feldmauu et al. ........................ 303/3 |
| 5,380,072 | * | 1/1995 | Breen . |
| 5,438,516 | * | 8/1995 | Neubauer et al. . |
| 5,443,306 | * | 8/1995 | Broome .................................... 303/3 |
| 5,449,362 | * | 9/1995 | Chaisson et al. . |
| 5,496,096 | * | 3/1996 | Petersen et al. ........................... 303/3 |
| 5,503,468 | * | 4/1996 | Saffran . |
| 5,615,930 | * | 4/1997 | McGrath et al. . |
| 5,620,236 | * | 4/1997 | McGrath et al. ......................... 303/7 |
| 5,785,393 | * | 7/1998 | McGrath et al. ......................... 303/7 |
| 5,800,025 | * | 9/1998 | McGrath et al. ......................... 303/7 |

OTHER PUBLICATIONS

"Closing the Loop on Brake Force"; Machine Design, May 23, 1996; pp. 54, 56.*

Force Imaging Technologies UniForce Applications brochure; 10 pages.*

A Magnetostrictive Pedal Force Sensor for Automotive Applications; SAE Technical Paper Series No. 960759; by Eric J. Hoekstra; pp. 43–46.*

* cited by examiner

Primary Examiner—Chris Schwartz

(57) ABSTRACT

An electronic brake controller for controlling electric brakes of a towed vehicle, such as a trailer, wherein the controller includes a resistive braking force sensor that senses the braking force applied by the driver of the towing vehicle to the brake pedal and provides an electrical signal proportional to the braking force to an electronic control unit. The electronic control unit is operable when a microprocessor thereof detects the brake light "on" condition and the presence of the force sensor. The microprocessor receives the signal from the braking force sensor and controls braking force applied to the trailer brakes in proportion to the force applied by the driver of the towing vehicle to the brake pedal. During operation, the microprocessor reads ambient temperature compensated electrical conductance of the braking force sensor to provide a temperature compensated output signal proportional to the braking force to actuate the trailer electric brakes. The electronic controller optionally includes a remote driver-operable control unit tethered by a quick-disconnect wiring harness to a main electronic control unit that is attached to the vehicle hidden out of sight and hard wired to the vehicle electrical system.

10 Claims, 7 Drawing Sheets

ELECTRONIC TRAILER BRAKE CONTROLLER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to an electronic brake controller for a towing vehicle for controlling electric brakes of a towed vehicle, such as a trailer, with braking force feedback provided by a force sensor associated with the brake pedal of the towing vehicle.

BACKGROUND OF THE INVENTION

Recreational and utility trailers often are towed by automobiles, pick-up trucks, and other vehicles, such as recreational vehicles. The trailers are provided with an electric braking system that includes a pair of brake shoes (for a two wheeled trailer) which are actuated by a well known electromagnet-actuated lever device to apply a braking force to the drums of the trailer wheels. Generally, the braking force applied by the brake shoes against the wheel drums is proportional to the electric current supplied to the wire coils of the electromagnets.

Electronic brake controllers are available which include a sensing device that generates a brake control signal corresponding to the desired magnitude of braking force to be applied to the towed vehicle. For example, a pendulum is used in some electronic brake controllers to sense deceleration of the towing vehicle upon braking and generate a brake control signal proportional to movement of the pendulum, for example, as described in U.S. Pat. No. 4,721,344.

Such electronic brake controllers usually include an analog pulse width modulator which receives the brake control signal from the sensing device. The pulse width modulator is responsive to the brake control signal to generate an output signal that has constant frequency pulse train with the duty cycle of the pulse train varied in proportion to the magnitude of the brake control signal from the sensing device. An output stage of the controller is electrically connected to the output of the pulse width modulator. The output stage can have multiple power transistors which are connected between the towing vehicle power supply and the towed vehicle brake electromagnets and which function as an electronic switch for supplying electric current to the coils of the electromagnets. The output is responsive to the pulse width modulator output signal to switch the power transistors between conducting and nonconducting "on"/"off" states. As the transistors are so switched, the brake current is divided into a series of pulses. The power supplied to the towed vehicle electromagnets and the resulting magnitude of braking are directly proportional to the duty cycle of the output signal of the pulse width modulator.

An object of the present invention is to provide an electronic brake controller for controlling electric brakes of a towed vehicle in a manner to provide the driver of the towing vehicle with improved control over braking force applied to the wheels of the towed vehicle.

Another object of the present invention is to provide an electronic brake controller for controlling electric brakes of a towed vehicle in a manner to provide a braking force to the wheels of the towed vehicle that is proportional to the braking force applied by the driver to the brake pedal of the towing vehicle.

Still another object of the present invention is to provide an electronic brake controller for controlling electric actuated brakes of a towed vehicle with braking force to the trailer brakes controlled in response to feedback provided by a resistive brake pedal pad sensor that senses the braking force applied by the driver of the towing vehicle.

A further object of the present invention is to provide an electronic brake controller having a main electronic control unit hard wired to the vehicle electrical system and a remote driver-operable manual control unit tethered to the main electronic control unit and positioned at a desired driver-selected location in the towing vehicle to facilitate actuation by the driver of the towing vehicle.

SUMMARY OF THE INVENTION

The present invention provides in one embodiment an electronic brake controller for controlling electric brakes of a towed vehicle, such as a trailer, wherein the electronic brake controller includes a force sensor at the brake pedal of the towing vehicle that senses the braking force applied by the driver of the towing vehicle to the braking pedal by virtue of changes in electrical conductance (or resistance) thereof in dependence on the applied braking force. The force sensor provides an electrical signal proportional to the braking force applied to the brake pedal to an electronic control microprocessor.

The microprocessor receives an initial signal representative of initial electrical conductance (or resistance) of the sensor when the brakes of the towing vehicle are not actuated and a subsequent braking force signal representative of subsequent electrical conductance (or resistance) thereof when the brake pedal is pressed by the driver of the towing vehicle. The microprocessor converts the force sensor signals to corresponding braking output signals and controls braking force applied to the trailer brakes in proportion to the force applied by the driver of the towing vehicle to the brake pedal.

In an illustrative embodiment of the invention, the electronic brake controller is operable to control the towed vehicle electric brakes when the microprocessor detects the towing vehicle brake light "on" condition and the presence of the brake pedal force sensor. During operation, the microprocessor samples the brake pedal force sensor. The microprocessor compares an initial sensor signal (representative of initial sensor conductance) measured when the towing vehicle brake lights are "off" and stored in the microprocessor as a reference sensor conductance value and a subsequent braking signal from the force sensor (representative of subsequent sensor conductance) measured when the towing vehicle brake lights are "on". From the comparison, the microprocessor provides an output signal to the electric brakes of the towed vehicle that is proportional to the braking force applied by the driver to the towing vehicle brake pedal. In a preferred embodiment of the invention, the microprocessor reads an ambient temperature compensated, amplified braking force signal to provide a temperature-compensated output signal representative of brake force to be applied to the towed vehicle electric brakes.

In one embodiment of the invention, the microprocessor initially reads the force sensor and stores this number or value as an initial reference signal. Thereafter, when the force sensor is activated by the driver's pressing on the brake pedal (brake light "on"), the microprocessor reads the force sensor, determines a higher number or value resulting from pressure on the brake pedal, and subtracts the initial number or value from the subsequent measured number or value and provides an output signal to the electric brakes of the towed vehicle that is proportional to the braking force applied by the driver to the towing vehicle brake pedal (i.e. the difference between the aforementioned initial and subsequent number or value).

When the towing vehicle brakes are not actuated by the driver (brake light is "off"), the microprocessor assumes a sleep mode with periodic wake ups to initially read the brake pedal force sensor signal. If the force sensor is not installed or becomes inoperative (e.g. by becoming disconnected), then the microprocessor will operate in a non-sensor mode where the output signal to the towed vehicle brakes will ramp up with time upon actuation of the brakes pursuant to a preset output setting (braking force) and ramp setting (rate of application of braking force) of the controller. The electronic brake controller also is operable in a manual mode controlled directly by the driver and overriding the brake pedal sensor and non-sensor modes of the microprocessor.

In another embodiment of the invention, the electronic brake controller includes a remote driver-operable manual control unit tethered by a quick-disconnect wiring harness to a main electronic control unit that is attached to the towing vehicle typically in a manner to be hidden from sight and hard wired to the towing vehicle electrical system. The main control unit includes the microprocessor and hookup wiring to the towing vehicle electrical system, while the remote control unit includes a digital display, output setting control, optional ramp setting control, and manual control required to operate the electronic brake controller in various modes. The remote control unit can be mounted releasably at any convenient location on the instrument panel of the vehicle to render operation of the brake controller more convenient by the driver during operation of the towing vehicle. The remote control unit can be disconnected from the main control unit and stored when not in use. In the event the remote control unit is disconnected from the main control unit, the brake controller will operate in a non-sensor mode where the output signal to the towed vehicle brakes will ramp up with time upon actuation of the brakes pursuant to a preset output setting (braking force) and ramp setting (rate of application of braking force) programmed into the microprocessor. If the brake controller is not programmed, the microprocessor will use default settings of the output setting and ramp setting.

The above and other objects and advantages of the present invention will become more readily apparent from the following detailed description taken in conjunction with the drawings.

DESCRIPTION OF THE INVENTION

Figure 1:
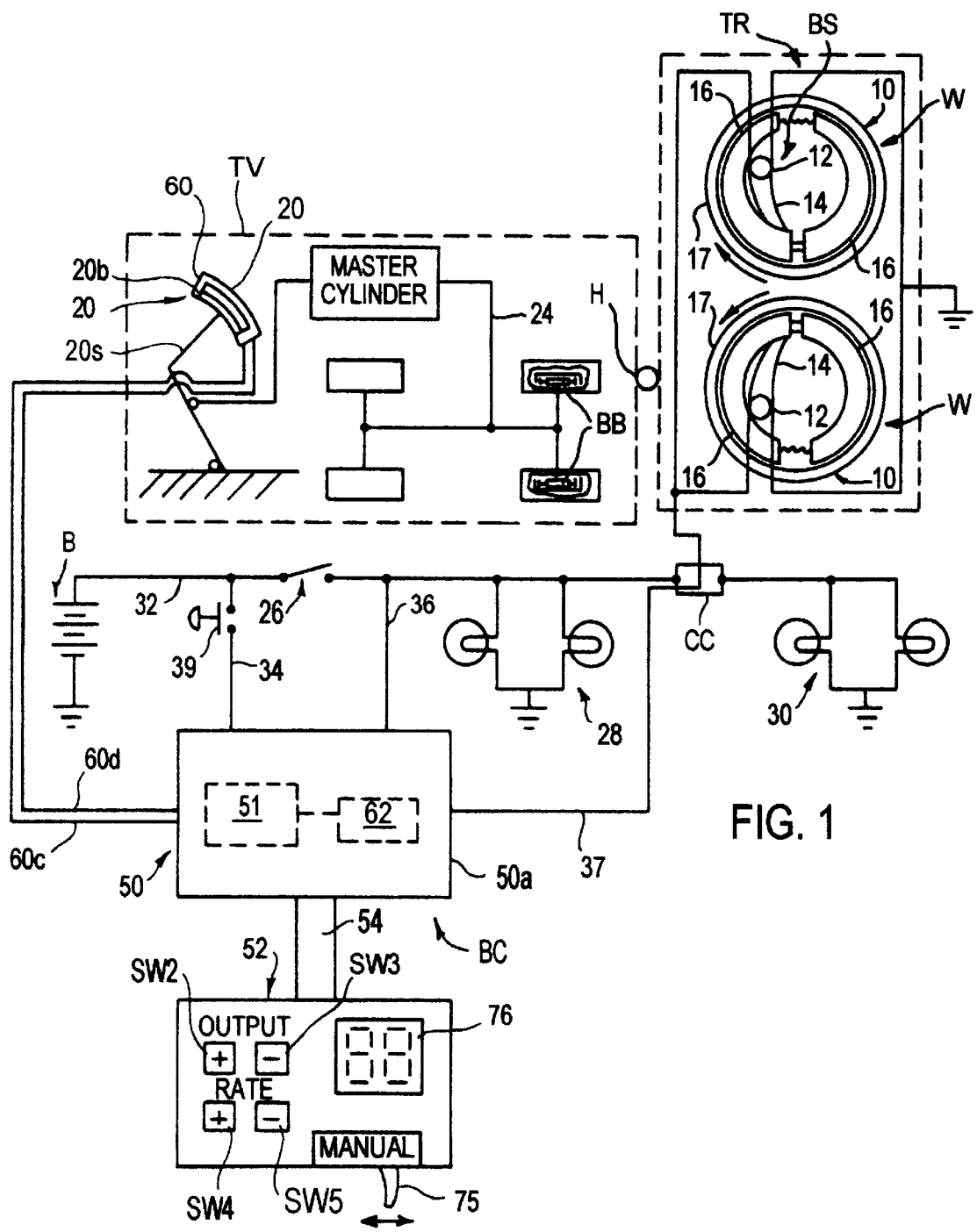
FIG. 1 is a schematic diagram illustrating a towed vehicle electric brake control system controlled by an electronic brake controller of a towing vehicle pursuant to an illustrative embodiment of the invention.

Referring to FIG. 1, a towing vehicle TV, such as an automobile, pick-up truck, and the like, is schematically shown connected by a hitch H or other connection to a towed vehicle, such as a trailer, TR. The towed vehicle TR is schematically shown having an electric braking system BS, while the towing vehicle TV is schematically shown having an electronic brake controller BC in accordance with an illustrative embodiment of the present invention for controlling the electric braking system of the towed vehicle.

The electric braking system BS of the towed vehicle comprises a conventional electric brake 10 associated with each wheel W of the towed trailer TR. The electric brake for each trailer wheel includes an electromagnet 12 and lever 14 connected to the electromagnet in a manner to pivot and engage the brake shoes 16 against the respective brake drum 17 of the trailer wheel to brake the wheel when electrical current is supplied to the coils (not shown) of the electromagnets 12 from brake controller BC. Such electric brakes for a trailer or other towed vehicle are well known and shown, for example, in U.S. Pat. 4,398,252.

The towing vehicle TV is schematically shown to include a conventional hydraulic brake system which is actuated by the driver of the towing vehicle pressing on a brake pedal 20. The driver-operated brake pedal 20 actuates a piston (not shown) of the master brake cylinder 22 to provide hydraulic brake fluid via hydraulic fluid lines 24 to conventional drum or disc brakes BB at each wheel of the towing vehicle.

When the brake pedal 20 is pressed to actuate braking of the towing vehicle, a switch 26 is closed so that electrical power of the towing vehicle storage battery B (nominal battery voltage of 13.5 volts with high of 16 volts and low of 9.0 volts) is supplied to the towing vehicle brake lights 28 and to the towed vehicle (trailer) brake lights 30 in conventional well known manner.

The electronic brake controller BC includes lead wire 32 connected to the battery B so that electrical power is continuously supplied to the main control unit 50 of the controller BC to power components thereof as described below. The controller BC also is connected by lead wire 34 to brake light switch 26 such that electrical power is supplied via lead wire 36 to the controller BC when the brake light switch is closed by the driver pressing on brake pedal 20 to actuate the towing vehicle brakes. The controller BC is connected to a plurality of coils (not shown), such as up to eight coils, of the electric brakes 10 of the trailer TR by a wire lead 37 and connector CC to provide output signals in proportion the braking force applied to the brake pedal 20 by the driver of the towing vehicle TV. The output signals to the coils of the electric brakes 10 effect braking of the wheels of the trailer TR. The return wire from each coil of each electric brake of the trailer TR is connected to ground.

The electronic brake controller in accordance with one illustrative embodiment of the invention includes main electronic control unit 50 that is attached to the towing vehicle TV (e.g. under the instrument panel or dashboard in the vehicle interior cabin) and is hard wired to the towing vehicle electrical system and a remote driver-operable control unit 52 tethered by a quick-disconnect wiring harness 54 to the main electronic control unit 50. The main control unit 50 has a "ground" terminal or input that is connected to the chassis ground of the towing vehicle TV. The vehicle must have a negative ground electrical system for the embodiment of the invention described herein. The main control unit 50 also has a "battery" terminal or input that is connected to the positive terminal of the 12 volt battery through an external 30 ampere circuit breaker 39 of lead wire 34.

The main electronic control unit 50 typically is attached beneath the dashboard of the towing vehicle TV by a cable tie strap, Velcro tape or other in a manner to be hidden from sight and hard wired to the towing vehicle electrical system as shown in FIG. 1. The main control unit includes the microprocessor and hookup wiring to the towing vehicle electrical system, while the remote control unit includes a digital display, output setting control, optional ramp setting control, and manual control required to operate the electronic brake controller in various modes. Instead of having a ramp setting on the remote control unit, a preset ramp setting can stored in the software program of the microprocessor 51. The remote control unit can be mounted releasably by Velcro tape or other releasable connector at any convenient location on the instrument panel or dashboard of the towing vehicle to render operation of the brake controller more convenient by the driver during operation of the towing vehicle. For example, the remote control unit 52 can be mounted more nearly in the line of sight of the driver to facilitate its operation while the towing vehicle is driven. The remote control unit 52 can be easily disconnected from the main control unit 50 by disconnecting the quick-release wiring harness from the the main electronic control unit 50 and then stored when not in use.

The electronic brake controller includes a resistive force sensor 60 located at the towing vehicle brake pedal 20. The resistive force sensor 60 senses the braking force applied by the driver of the towing vehicle to the braking pedal 20 and provides an analog electrical signal proportional to the force applied by the driver of the towing vehicle to the brake pedal 20 to microprocessor 51 of the main electronic control unit 50.

To this end, resistive force sensor 60 is shown in FIG. 1 disposed beneath a conventional rubber foot pad 20a of the brake pedal 20. In particular, the force sensor 60 is held between the rubber pad 20a and the rigid steel support platform 20b of the brake peal 20 so that the driver's foot pressure on the rubber pad 20a is transmitted to the force sensor 60. For example, the force sensor 60 is inserted without adhesive into a typical recess molded on the rubber pad in the side thereof facing the brake pedal platform 20b. Then, the rubber pad 20a is friction fitted onto the pedal platform 20b in usual manner with the force sensor 60 held therebetween without adhesive. The elongated neck shown in FIG. 2 of the force sensor can be routed along the brake pedal shaft 20s.

Figure 2:
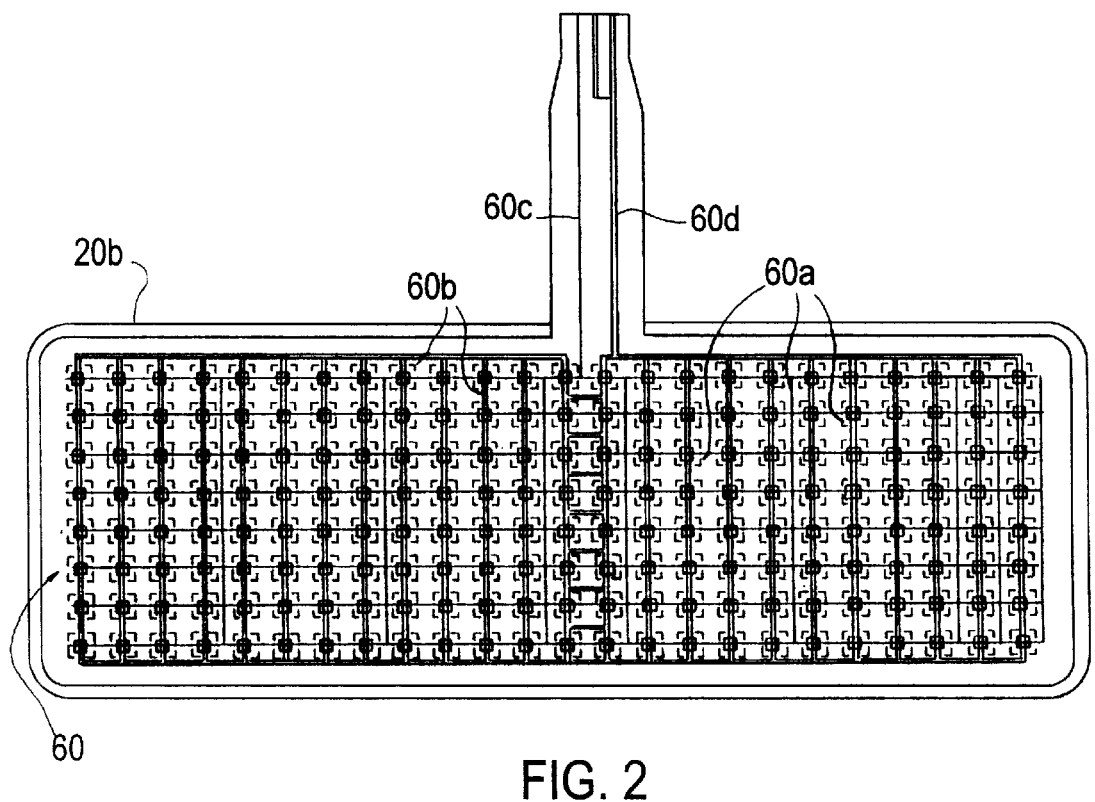
FIG. 2 is a view of a braking force sensor on a side of a brake pedal facing the rigid brake pedal support pursuant to an embodiment of the invention.

The force sensor 60 comprises a thin flexible laminated sheet assembly (e.g. thickness of 0.006 inch) comprising a pattern of a plurality of force sensing elements 60a that are interconnected by sensor silver conductors 60b and to lead wires 60c, 60d across which conductance or resistance is measured with a particular applied voltage across the lead wires, FIG. 2. The force sensor 60 exhibits a change in electrical conductance (e.g. increase in conductance) or resistance at a particular applied voltage as force is applied by the driver to the sensor 60 via the foot pad 20a of the brake pedal 20. For example, an applied voltage of 1 V (volt) DC is applied across the force sensor lead wires 60c, 60d and analog signals representative of electrical conductance of the force sensor 60 are sent to an inverting operational amplifier OP shown in FIG. 3 having an analog output voltage ranging from 0 to 5 volts. A resistive force sensor 60 for practicing the invention is available as a Uniforce sensor from Force Imaging Technologies, Inc. 3424 Touhy Ave., Chicago, Ill. Lead wire 60d comprises two wires connected to electrical connector C as shown in FIG. 3.

Figure 3:
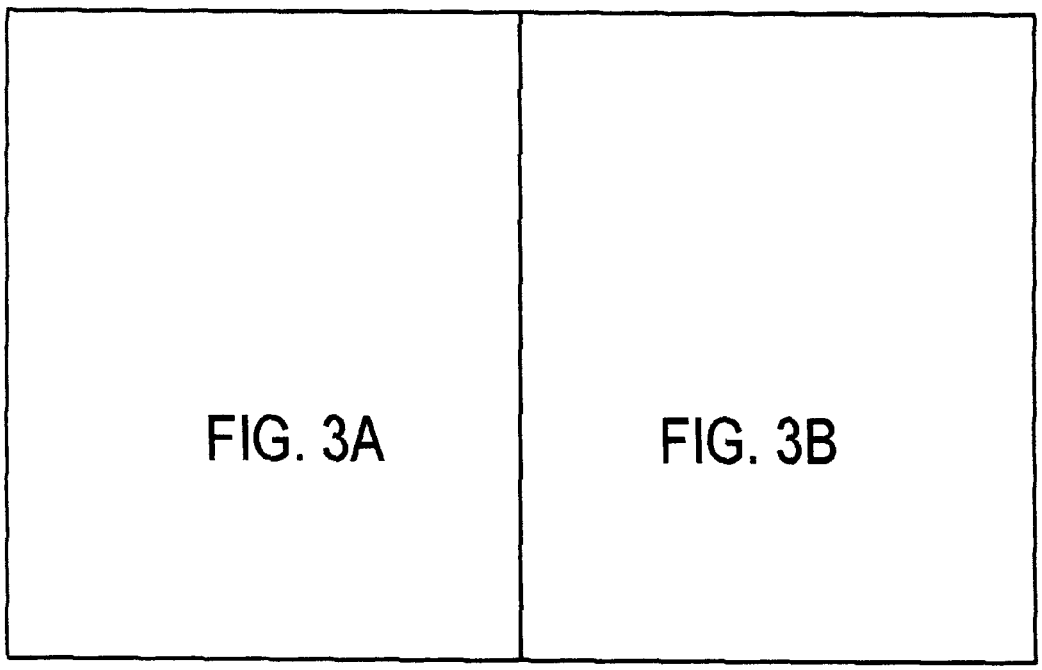
FIG. 3 comprising
Figure 3A:
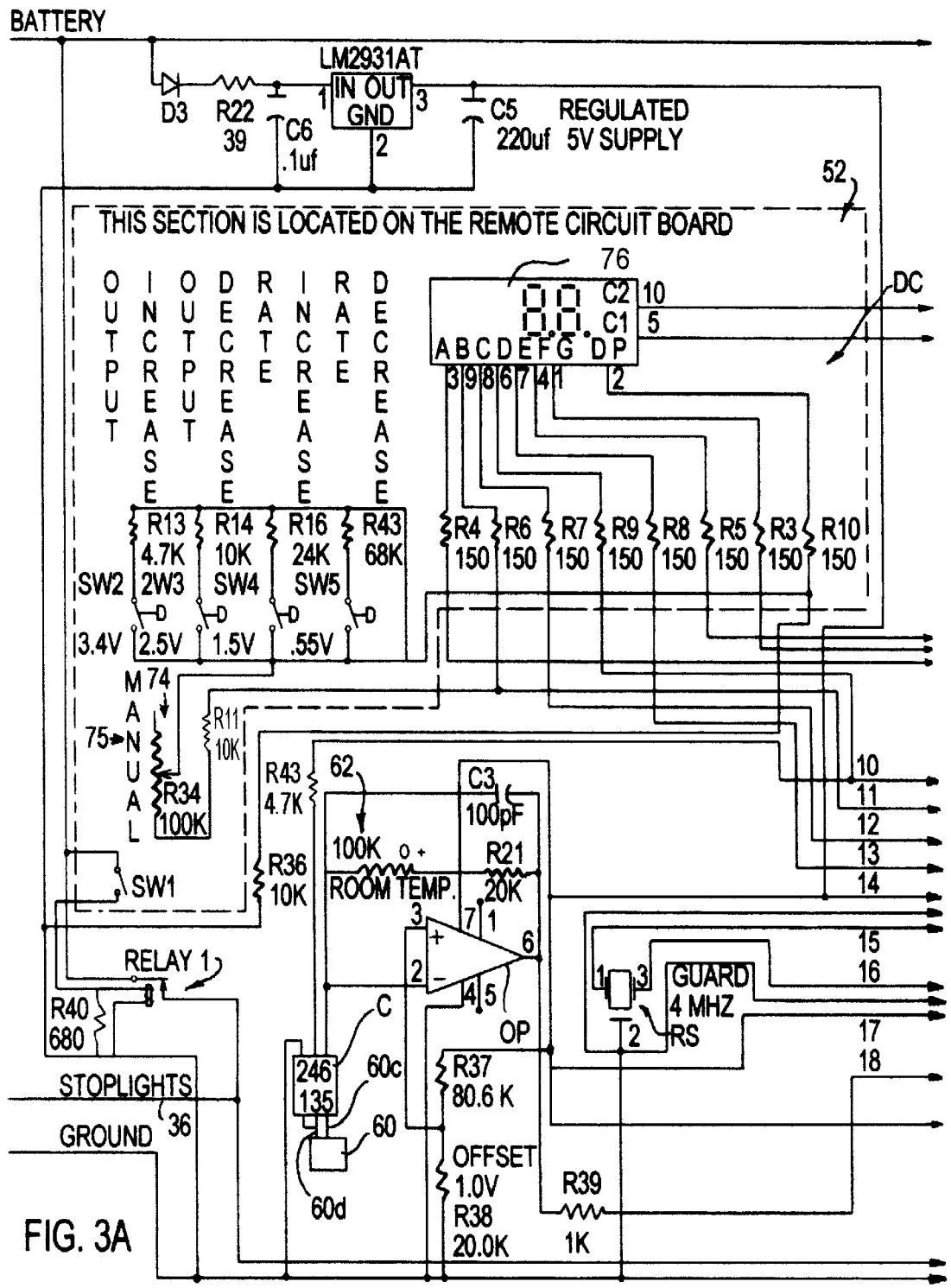
FIG. 3A, 3B is an electrical diagram of a electronic brake controller pursuant to an illustrative embodiment of the invention.
Figure 3B:
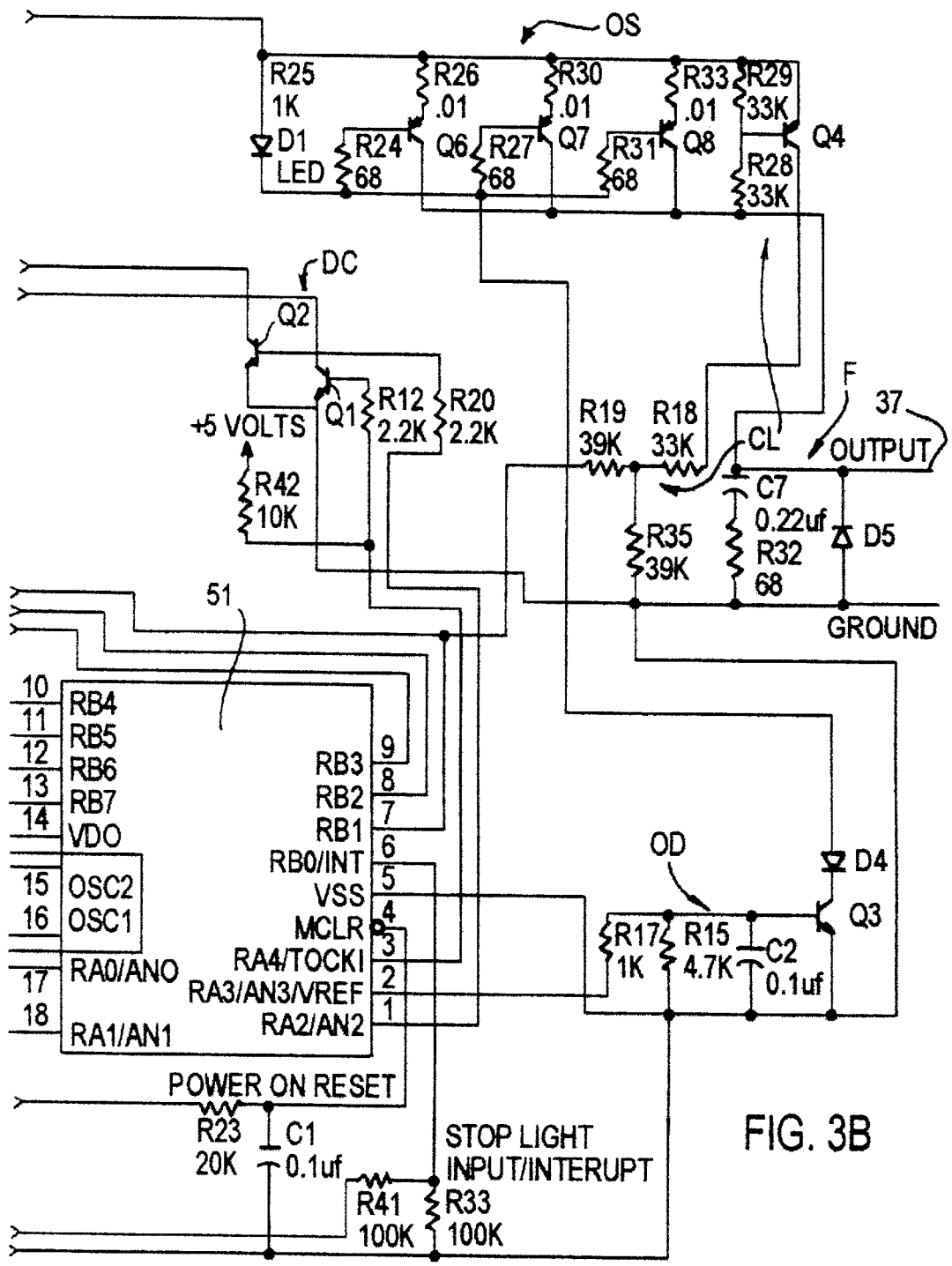

The force sensor 60 is connected to the amplifier OP via the lead wires 60c, 60d and a conventional connector C as shown in FIG. 3 and described below to provide analog signals representative of changes of the electrical conductance (or resistance) of the sensor 60 to the amplifier OP, which in turn provides signals to the microprocessor 51, which includes an internal analog-to-digital converter to provide digital signals for processing by the microprocessor. The microprocessor 51 is enclosed in a housing 50a of the main electronic control unit 50 and comprises a preprogrammed 200 to 300 Hz pulse width modulated analog/digital converter eight-bit microcontroller device having an output drive OD and output stage OS consisting of three PNP transistors protected by a overload shut-down circuit CL for currents over about 28 Amperes. A suitable microcontroller 51 for practicing the invention is available as model number PIC16C715 from Microchip Technology Inc., 2355 Wet Chandler Blvd., Chandler, Ariz.

Upon powering up of the electronic brake controller, the microprocessor 51 reads via amplifier OP an initial signal of the force sensor 60 representative of initial sensor conductance when there is no brake actuation signal (e.g. brake light is "off" condition) and stores the initial signal in a memory of the microprocessor. The microprocessor 51 assumes a "sensor" mode of operation whenever the force sensor 60 is detected by the microprocessor 51 with the brake lights 28 in the "on" condition (switch 26 closed), unless the driver of the towing vehicle selects a "manual" mode of operation using a manual slide control 75, FIGS. 1 and 3, on the driver-operable remote control device 52. In the "sensor" mode, the microprocessor 51 is responsive within about 25 milliseconds to the brake actuation signal (e.g. brake light is "on" at 12 volts) for receiving a braking force signal from the force sensor 60 via amplifier OP representative of an increase in sensor conductance when the brake pedal 20 is pressed by the driver of the towing vehicle.

The microprocessor 51 compares the initial signal and the subsequent braking force signal and provides via output drive OD and output stage OS an ambient temperature compensated output signal in proportion to the braking force applied by the driver to the brake pedal 20 of the towing vehicle to the electric wheel brakes of the towed vehicle or trailer TR. The preferred output signal of the microprocessor 51 comprises a constant frequency signal with a variable duty cycle that is proportional to the change in sensor conductance as a result of the driver pressing on the brake pedal 20.

Ambient temperature sensor 62 is provided and is connected as shown in FIG. 3 at the operational amplifier feedback position to provide automatic temperature compensation of the amplifier signal in dependence on prevailing ambient temperature when the conductance of the force sensor 60 is read by the microprocessor 51. The temperature sensor 62 preferably comprises a thermistor disposed in the housing 50a of the electronic control unit 50 so as to determine a change in ambient temperature in the cabin of the towing vehicle TV. For example, the thermistor exhibits a negative temperature coefficient with increasing temperature from about −40 degrees C. to +85 degrees C. that mimics the decrease or shift in electrical conductance of the force sensor 60 over the same temperature range.

The microprocessor 51 in the "sleep" mode referred to below periodically reads the force sensor 60 (e.g. reads a number from 0 to 255 representative of analog-to digital converted sensor conductance values described below) and stores this as an initial reference number or value. Thereafter, when the force sensor 60 is activated by the driver's pressing on the brake pedal (brake light "on" condition), the microprocessor 51 reads the force sensor 60 via amplifier OP, determines a subsequent higher number or value resulting from driver's foot pressure on the brake pedal, and subtracts the reference number or value (as a reference signal) from the subsequent measured number or value and provides an output signal to the electric brakes of the towed vehicle that is proportional to the braking force applied by the driver to the towing vehicle brake pedal (i.e. the difference between the aforementioned initial and subsequent number or value).

For example, the microprocessor 51 may have 20 different states or levels of the braking force signal in software program memory and representative of 5% incremental steps or changes (increases/decreases) of braking force signal. Typically, a particular number or value representative of change of electrical conductance read by the microprocessor 51 is divided one or more times by an appropriate number(s) pursuant to software programming to provide a predetermined number of desired incremental states or levels for stepping up of the braking force in increments. In operation in the "pedal sensor" mode, the microprocessor reads the force sensor 60 via the amplifier OP and determines a temperature compensated output signal based on the aforementioned difference in force sensor electrical conductance resulting from the driver's pressing on the brake pedal 20. The microprocessor 51 compares the temperature compensated output signal and determines a change in duty cycle of the pulse width modulated signal to be provided to the coils of the electromagnets 12 of the trailer electric brakes 10. In particular, the duty cycle of the output signal to the trailer brakes 10 is varied by the microprocessor software programming in incremental percentages in proportion to the sensed changes (differences in electrical conductance) of the sensor braking force signal.

For example, for a temperature compensated force sensor signal calculated as a value of 10 out of 20 by the microprocessor 51, the microprocessor provides a 50% increase in the duty cycle of the PWM pulse train to be provided instantaneously to the coils of the electromagnets 12 of the trailer electric brakes 10. For a temperature compensated force sensor signal calculated as a value of 5, the microprocessor 51 will provide a 25% increase in the duty cycle of the pulse train to be provided instantaneously to the coils of the electromagnets of the trailer electric brakes and so on such that the magnitude of braking force applied to the wheels W of the towed vehicle TR is proportional to the braking force applied by the driver to the brake pedal 20 of the towing vehicle TV.

In typical operation in the "sensor" mode when the brake light is energized by 12 volts to the "on" condition by the driver's pressing the brake pedal 20, the microprocessor 51 will read the force sensor 60 via amplifier OP to make sure it is connected, determine the braking force applied to the brake pedal 20, and activate the electric brakes 10 of the towed vehicle TR as described above with an output signal that is proportional to the force applied to the brake pedal 20.

If the force sensor 60 is not properly installed or becomes disconnected for some reason indicated by a relatively high voltage on pull up resistor R43 (a relatively low voltage on resistor R43 being indicative of the sensor being connected), the microprocessor 51 will so read the microprocessor port (e.g. RB4) that is connected to resistor 43 and operate in a "non-sensor" mode of operation which ramps the output signal up with time to the output setting set by the pushbutton output switches SW2 (increase), SW3 (decrease) at a rate set by the rate switches SW4 (increase), SW5 (decrease) which the driver of the towing vehicle pushes repeatedly as necessary to vary (increase or decrease) the output setting and rate setting. The microprocessor monitors the switches SW2, SW3, SW4, SW5 and determines and stores in program memory the incremental changes in the output setting and rate setting based on the number of times the switches are pushed by the driver. Rate switches SW4, SW5 are optional in which case an appropriate constant output rate is preset in program memory in an alternative embodiment of the invention and switches SW4, SW5 can be eliminated.

If the driver of the towing vehicle desires to operate the electronic brake controller in a "manual" mode, the driver pulls, slides or otherwise moves "manual" control or trigger 75, FIGS. 1 and 3, of the remote control unit 52 to override the "sensor" mode and the "non-sensor" mode of the microprocessor 51. In the "manual mode", the driver moves the manual control or trigger 75 (or other manually movable potentiometer control member) to vary the solid state potentiometer 74 in a manner to actuate the electric brakes of the trailer TR to a desired degree. In response to movement of the control or trigger 75 by the driver, the microprocessor 51 applies an output signal instantaneously to the electric brakes 10 of the trailer TR in proportion to the distance of movement of the manual control or trigger 75 of the remote control unit 52. In the "manual" mode, the maximum output signal (braking force) to the electric brakes will correspond to setting of switches SW2, SW3. In the "manual" mode and "non-sensor" mode, the brake lights 28 of the trailer TR are energized by a relay 1, FIG. 3, in response to closure of switch SW1 which is integrated into the solid state manual potentiometer 74 controlled by manually operated control or trigger 75 of the remote control unit 52.

The microprocessor 51 initially is programmed in a set-up mode to preset the output switches SW2, SW3 and rate switches SW4, SW5 without the force sensor 60 connected. The set-up mode is used to adjust the microprocessor 51 for the trailer load and sets the microprocessor so that it can operate in the aforementioned "non-sensor" mode in the event the force sensor 60 becomes disconnected.

In the set-up mode, the pushbutton output switches SW2, SW3 of the remote control unit 52 are pushed repeatedly as needed by the driver of the towing vehicle TV to provide a desired maximum pulse width modulated (PWM) duty cycle of the brake controller output. This setting will be the limit of braking force for both the "non-sensor" mode and the "manual" mode of operation. The pushbutton "rate" switches SW4, SW5 of the remote control unit 52 are used to set the ramp rate at which the "non-sensor" mode ramps up after the brake lights 28 are energized. The "manual" control trigger 75 of the remote control unit 52 is used by the driver to control the manual potentiometer 74 to actuate the electric brakes of the trailer TR independently of the brakes of the towing vehicle TV.

Figure 4A:
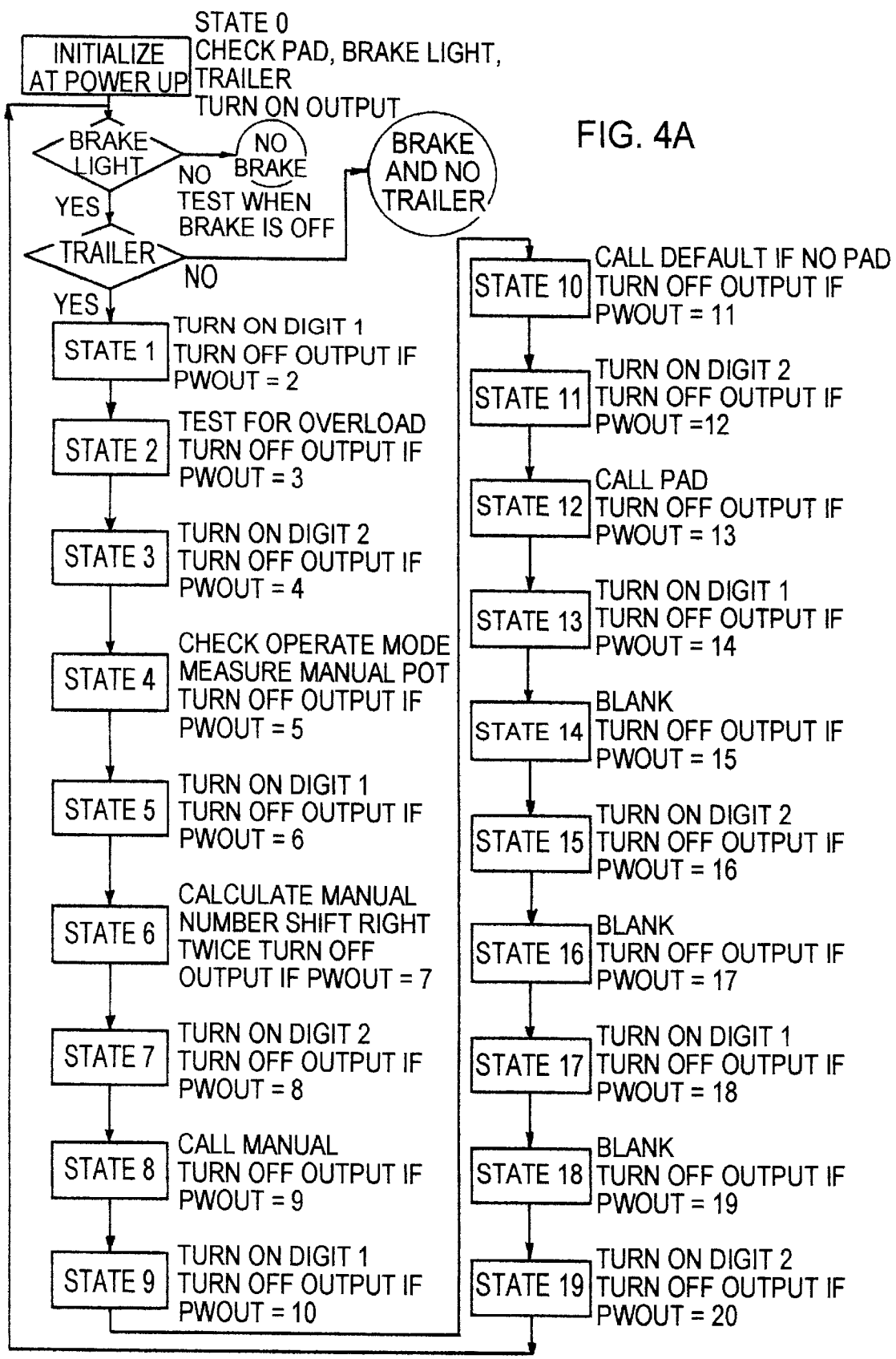
FIG. 4A is a logic flow diagram for an electronic brake controller pursuant to an illustrative embodiment of the invention with the brake pedal actuated by the driver (brake light "on" condition)
Figure 4B:
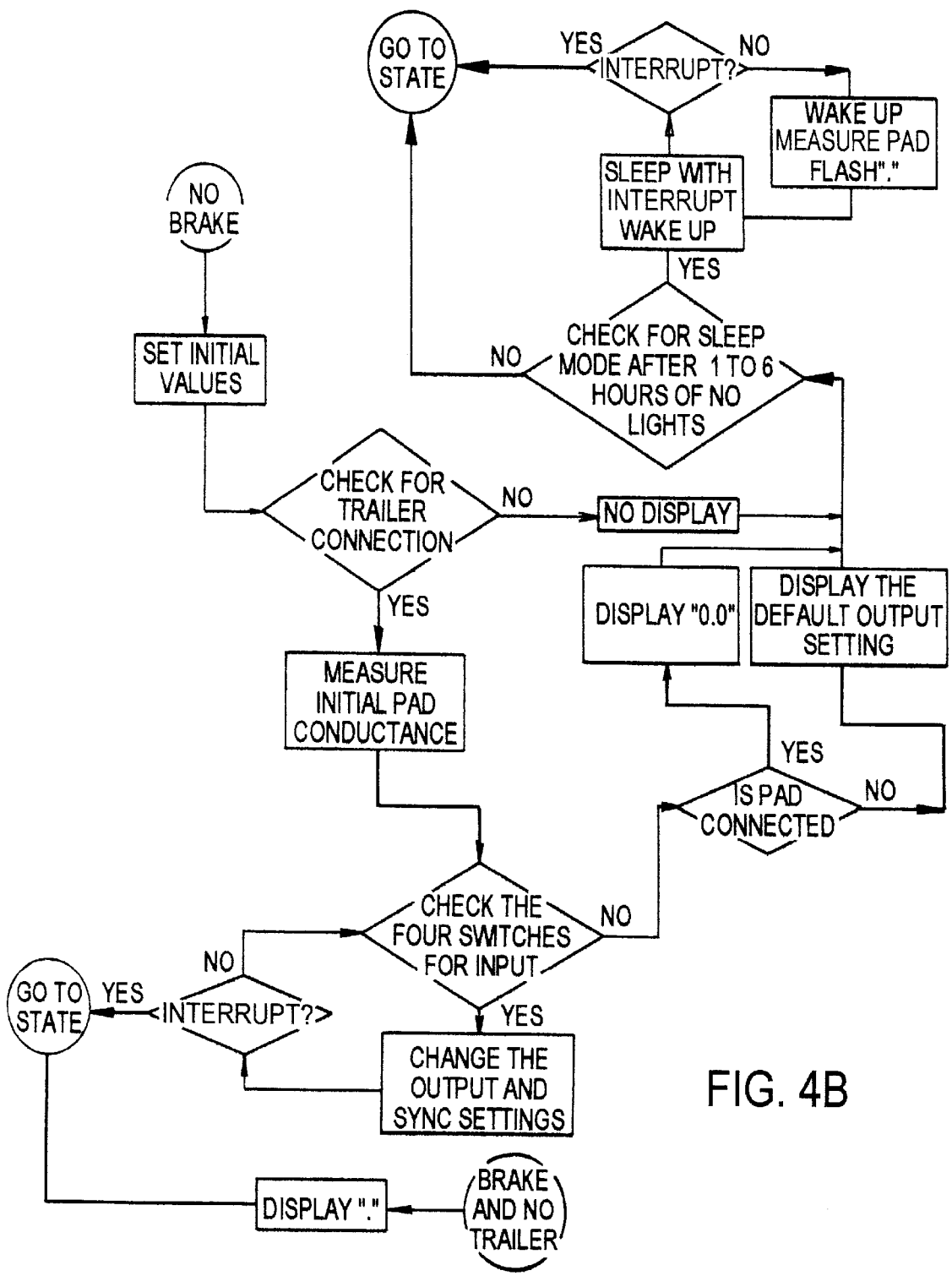
FIG. 4B is a logic flow diagram with the brake pedal not actuated (brake light "off" condition).

Referring to FIG. 4, when the brake pedal 20 is not being pressed by the driver of the towing vehicle (FIG. 4B), the microprocessor 51 assumes the aforementioned "sleep" mode of operation during which it will periodically wake up and read the signal of the brake pedal force sensor 60 via amplifier OP and store the reading in memory as the aforementioned initial signal (e.g. from 0 to 255 corresponding to the 0 to 5 volts output of the amplifier OP). When 12 volts is applied to the brake lights (to the "stoplight" input of FIG. 3) by closure of switch 26, the microprocessor 51 will be reset by reset circuit POWER ON RESET and start operating within 25 milliseconds thereafter pursuant to FIG. 4A. In particular, the microprocessor, will check the overload circuit CL to see if there is a proper electrical connection to the tailer brakes 10. If it is determined that the trailer brakes are not connected, the microprocessor will only display a single decimal point on LED display 76 for as long as the stoplight input has 12 volts applied to it. The microprocessor will retest the trailer brake light connection C once every 3–4 milliseconds. When the trailer is connected and there is no output, the overload circuit provides a high output indicative of trailer brakes connected. If it is determined that the trailer brakes are connected with the brake pedal 20 pressed by the driver, the microprocessor will proceed to the next operation, FIG. 4A.

The microprocessor will read or measure the manual potentiometer 74, pedal sensor 60, the port for resistor R43, output switches SW2, SW3, and optional rate switches SW4, SW5 and determine their values.

The microprocessor monitors the manual potentiometer 74 in order to determine if the brake controller is operating in the "manual" mode. If the microprocessor determines that the controller is operating in the "manual" mode, it will drive the output signal to the electric brakes of the trailer TR at a PWM level proportional to the manual setting of the manual potentiometer 74. In particular, if the manual potentiometer 74 measures under 2.5 volts, the brake controller will be in the "manual" mode of operation. For manual potentiometer values of 2.5 volts and above, the microprocessor 51 will go into either the "sensor" mode or "non-sensor" mode depending upon whether the force sensor 60 is detected or not.

If the microprocessor 51 determines that the brake controller is operating in the "non-sensor" mode, it will ramp the output signal from a minimum value to the limit set by the output switches SW2, SW3, if present. The rate of the ramping will be determined by the setting of rate switches SW4, SW5, if present, or will be constant rate preset in program memory. The non-sensor mode of operation will be displayed on the display 76 of the remote control unit 52 as the maximum output setting without the brake pedal being pressed (brake lights 28 off).

The control settings (settings of switches SW2, SW3, SW4, SW5) and driver feedback are displayed by two-digit LED display 76 on the remote control unit 52 and driven by the microprocessor 51 in usual manner. For example, the LED display 76 can display the output setting, rate setting, trailer connect indication, and "non-sensor" mode indication of the microprocessor 51 in the event the force sensor 60 becomes disconnected or is not installed.

The display 76 will indicate the output duty cycle provided to the electric brakes 10 of the trailer TR. For example, the display 76 will display between 0.0 and 10.0 in steps of 0.5. This value will correspond to the output signal and will be displayed as long as the "Stoplight" input has 12 volts applied to it. The display 76 will also indicate whether the pedal sensor 60 is connected to the controller or not. If the force sensor is connected, the display 76 will respond to pressure on the brake pedal 20. If the force sensor 60 is not connected, the display 76 will ramp up to the output setting when the brake light is "on" regardless of the pressure applied to the brake pedal 20.

The display mode is the same for the "sensor" mode and "non-sensor" mode when the brake light is "on". When the brake controller is off (i.e. brake light is "off"), the display reads "0.0" in the "sensor" mode and a microprocessor default maximum output setting when the brake controller is in the "non-sensor" mode. The default maximum output setting remains displayed for about 10 minutes and then turns off after 10 minutes with the brake controller in the "sleep" mode.

In the "non-sensor" mode with brake lights 28 "off", once the output signal reaches the limit set by the switches SW2, SW3, the microprocessor 51 must monitor the rate switches SW4, SW5 to determine if rate is changing. A change in the rate switches SW4, SW5 indicates that the ramping rate is being adjusted. When the microprocessor detects an adjustment to the rate switches SW4, SW5, the display 76 will switch to a rate display mode and indicate the rate setting. This will be displayed as 0 to 9 followed by "o" (lower 4 display segments) in steps of one (1). For example, "9o" will indicate the most aggressive ramp setting, while "Oo" will indicate the least aggressive ramp setting. Once in ramp rate display mode, the microprocessor will stay in that display mode for a short time (e.g. few seconds).

In the event of a hardware fault other than open or shorted load, the microprocessor 51 will shutdown the output and display "Er" on the LED display 76 as long as 12 volts is applied to the "stoplight" input.

If an overload is applied to the output transistors Q6, Q7, Q8, the output stage OS must shutdown within 3 millisecond for example only. When this occurs, the microprocessor will disable the output and display "OL" on the display 76 for 100 milliseconds. The microprocessor then will blank the display 76, wait 200 milliseconds and try the output again.

In the event the remote control unit is disconnected from the main control unit, the brake controller will operate in a non-sensor mode where the output signal to the towed vehicle brakes will ramp up with time upon actuation of the brakes pursuant to a preset output setting (braking force) and ramp setting (rate of application of braking force) programmed into the microprocessor. If the brake controller is not programmed, the microprocessor will use default settings of the output setting and ramp setting.

FIG. 3 illustrates an electrical diagram for practicing one illustrative embodiment of the invention pursuant to the operating description described above.

The microprocessor 51 includes output drive OD including resistor R17, R15, capacitor C2 and transitor Q3 and diode D4 having resistance (ohms or K ohms), capacitance, etc. values as shown in FIG. 3. A resonator RS is associated with the microprocessor to provide clock function therefor.

The force sensor input to the microprocessor comprises force sensor 60 described having lead wires 60c, 60d to electrical connector C. Inverting operational amplifier OP having the ambient temperature sensor 62 (100 K Ohm at room temperature) in the amplifier feedback position provides to microprocessor 51 automatic temperature compensated analog voltage signals representative of measured electrical conductance of the force sensor 60 referenced to a fixed, feedback resistance provided by resistor 21. In practicing the invention, the force sensor 60 can be used in conjunction with the E-Kit Circuit having amplifier OP, resistor R2 and filtering capacitor C3 provided by the sensor manufacturer, Force Imaging Technologies, 3424 Toughy Avenue, Chicago, Ill. 60645-2717 wherein a constant 1 V DC voltage is provided across the lead wires of the force sensor. The analog-to-digital converter of microprocessor 51 changes this voltage level to a digital value between 0 and 255. Resistors R37 and R38 provide the aforementioned 1 V reference voltage for the sensor. Resistor R39 is a current limiting resistor for microprocessor 51.

The aforementioned manual potentiometer 74 is part of a voltage divider that includes resistor R34 and resistor R11 to provide a minimum value of the divider and is connected to microprocessor 51 as shown to allow the driver to operate the brake controller in the "manual" mode as described above. Voltage range of the potentiometer 74 is 2.5 V to 0.4 V to microprocessor A/D input. Normal "off" position resistance of the potentiometer is 0 Ohm. To the microprocessor A/D input having pull-up resistor R36, manual "off" voltage is 2.5 V. The manual stoplight switch SW1 controls the relay 1 and associated resistor R40 to turn on the brake lights 28 when the driver is operating the brake controller in the "manual" mode. Pushbutton output switches SW2, SW3 and their resistors R13, R14 provide setting of the pulse width modulated duty cycle of the output signal of the microprocessor, while pushbutton rate switches SW4, SW5 and their resistors R16, R43 provide for setting the ramp rate at which the "non-sensor" mode ramps up after the brake lights 28 are energized.

The output stage Os of the brake controller comprises there PNP transistors Q6, Q7, and Q8 as shown with associated biasing resistors R24, R27, and R31 and associated resistors R25, R26, R30, and R33 having resistance values shown in FIG. 3. Light emitting diode (LED) D1 and resistor R25 are provided in prototype tests to observe power on/off of the output stage. Overcurrent protection of the controller output transistors is provided by circuit CL that includes transistor Q4 and associated resistors R28, R29, R19, R18, R35. A filter F comprising capacitor C7, resistors R32 and diode D5 provides conventional filtering of transient signals at the output of the brake controller.

A reset circuit POWER ON RESET comprising resistors R23, R41, R33 and capacitor C1 provides power on resetting of the microprocessor 51. The display circuit DC comprises conventional LED display 76 and current limiting resistors R3, R4, R5, R6, R7, R8, R9, R10 and display digit select including transistors Q1, Q2 and associated resistors R12, R20, R42.

A voltage regulator circuit REGULATED 5V SUPPLY provides a 5 volt regulated voltage to the brake controller electronic components. The voltage regulator circuit REGULATED 5V SUPPLY comprises a conventional voltage regulator chip LM2931AT and associated diode D3, capacitors CS, C6 and resistor 22.

The present invention is advantageous to provide an electronic brake controller that provides the driver of the towing vehicle with improved control over braking force applied to the wheels of the towed vehicle. The braking force applied to the towed vehicle brakes is proportional to the braking force applied by the driver to the brake pedal of the towing vehicle to this end. Moreover, the electronic brake controller can be controlled by the driver of the towing vehicle using a remote driver-operable manual control unit having manual, output, and rate controls and a display device for easier operation of the brake controller by the driver during operation of the towing vehicle.

It is to be understood that the invention has been described with respect to certain specific embodiments thereof for purposes of illustration and not limitation. The present invention envisions that modifications, changes and the like can be made therein without departing from the spirit and scope of the invention as set forth in the appended claims.

We claim:

1. An electronic brake controller for a towing vehicle for controlling actuation of electric wheel brakes of a towed vehicle in response to actuation of brakes of the towing vehicle, comprising:

a force sensor disposed at a brake pedal of said towing vehicle in a manner to sense a braking force applied by a driver to said brake pedal of said towing vehicle, said sensor being positioned to receive the braking force applied by the driver by pressing on said brake pedal and to exhibit a change in electrical conductance or resistance that is proportional to said braking force, a brake actuation signal generator responsive to the driver pressing on said brake pedal to provide a brake actuation signal, an electronic control unit connected to said brake actuation signal generator and to said force sensor, said control unit including a microprocessor for determining an initial signal of said force sensor representative of initial electrical conductance or resistance thereof when there is no brake actuation signal and storing said initial signal in a memory of said microprocessor, said microprocessor being responsive to said brake actuation signal for receiving a subsequent braking force signal from said force sensor representative of a subsequent electrical conductance or resistance thereof when the driver presses on said brake pedal, comparing said initial signal and said subsequent braking force signal to provide an output signal equal to a difference between said initial signal and said subsequent braking force signal proportional to braking force applied by the driver to said brake pedal, and providing said output signal to said electric wheel brakes of said towed vehicle.

2. The controller of claim 1 including a remote driver-operable control unit tethered by a quick-disconnect wiring harness to a main electronic control unit that is attached to the towing vehicle and hard wired to the towing vehicle electrical system, said main control unit including said microprocessor.

3. The controller of claim 2 wherein said remote control unit includes a digital display, an output signal setting control for setting maximum braking force to be applied to said electric wheel brakes in a non-sensor mode, and a manual control.

4. The controller of claim 3 wherein said remote control unit is mounted on the instrument panel of the towing vehicle.

5. The controller of claim 3 wherein said remote control unit is releasably connected to said main control unit for disconnection therefrom when not in use.

6. The controller of claim 1 including an ambient temperature sensor in said towing vehicle for automatically adjusting said initial signal and said subsequent braking force signal for prevailing ambient temperature.

7. The controller of claim 6 wherein said ambient temperature sensor comprises a thermistor in an amplifer feedback position.

8. The controller of claim 1 wherein said brake actuation signal generator comprises a connection to a brake light circuit of said towing vehicle such that said microprocessor receives said subsequent braking force signal when a brake light is turned "on" by the driver pressing on said pedal.

9. The controller of claim 1 wherein said microprocessor has stored in program memory a default output signal and default rate signal.

10. The controller of claim 1 wherein, when said force sensor is not installed or becomes inoperative, said microprocessor assumes a non-sensor mode where said output signal is ramped up over time when the driver presses on said brake pedal pursuant to a preset output setting corresponding to a maximum braking force to be applied to said electric wheel brakes.

* * * * *